United States Patent [19]
Wright et al.

[11] Patent Number: 5,205,129
[45] Date of Patent: Apr. 27, 1993

[54] APPARATUS FOR FREEZING AND DISPENSING SEMI-FROZEN FOOD PRODUCTS HAVING DUAL FREEZING CHAMBERS AND METHOD

[75] Inventors: Gregory A. Wright, Machesney Park, Ill.; Peter F. McNamee, Beloit, Wis.

[73] Assignee: Specialty Equipment Companies, Inc., Rockton, Ill.

[21] Appl. No.: 875,836

[22] Filed: Apr. 30, 1992

[51] Int. Cl.$^5$ .............................................. A23G 9/12
[52] U.S. Cl. ............................................ 62/68; 62/136
[58] Field of Search ............................ 62/68, 136, 342

[56] References Cited

U.S. PATENT DOCUMENTS

| | | | |
|---|---|---|---|
| 1,442,945 | 1/1923 | Hauk | 62/68 |
| 2,608,833 | 9/1952 | Woodruff | 62/342 |
| 3,626,709 | 12/1971 | Yuza | 62/136 |
| 4,869,072 | 9/1989 | Sexton et al. | 62/136 |
| 5,095,710 | 3/1992 | Black et al. | 62/68 |
| 5,158,506 | 10/1992 | Kusano et al. | 62/136 |

*Primary Examiner*—William E. Tapolcai
*Attorney, Agent, or Firm*—Vernon J. Pillote

[57] ABSTRACT

An apparatus for freezing and dispensing semi-frozen food products having two freezing chambers, one compressor for supplying refrigerant to both freezing chambers, one beater drive motor for driving the beaters in both chambers, two solenoid valves control flow of refrigerant from the single compressor to the evaporators for the freezing chambers and periodic pulse width modulated signals are applied to operate the two solenoid valves alternately during each period and signals are modulated to have substantially equal duty cycles in an initial freeze mode and to have unequal duty cycles when product is dispensed from only one freeze chamber.

25 Claims, 5 Drawing Sheets

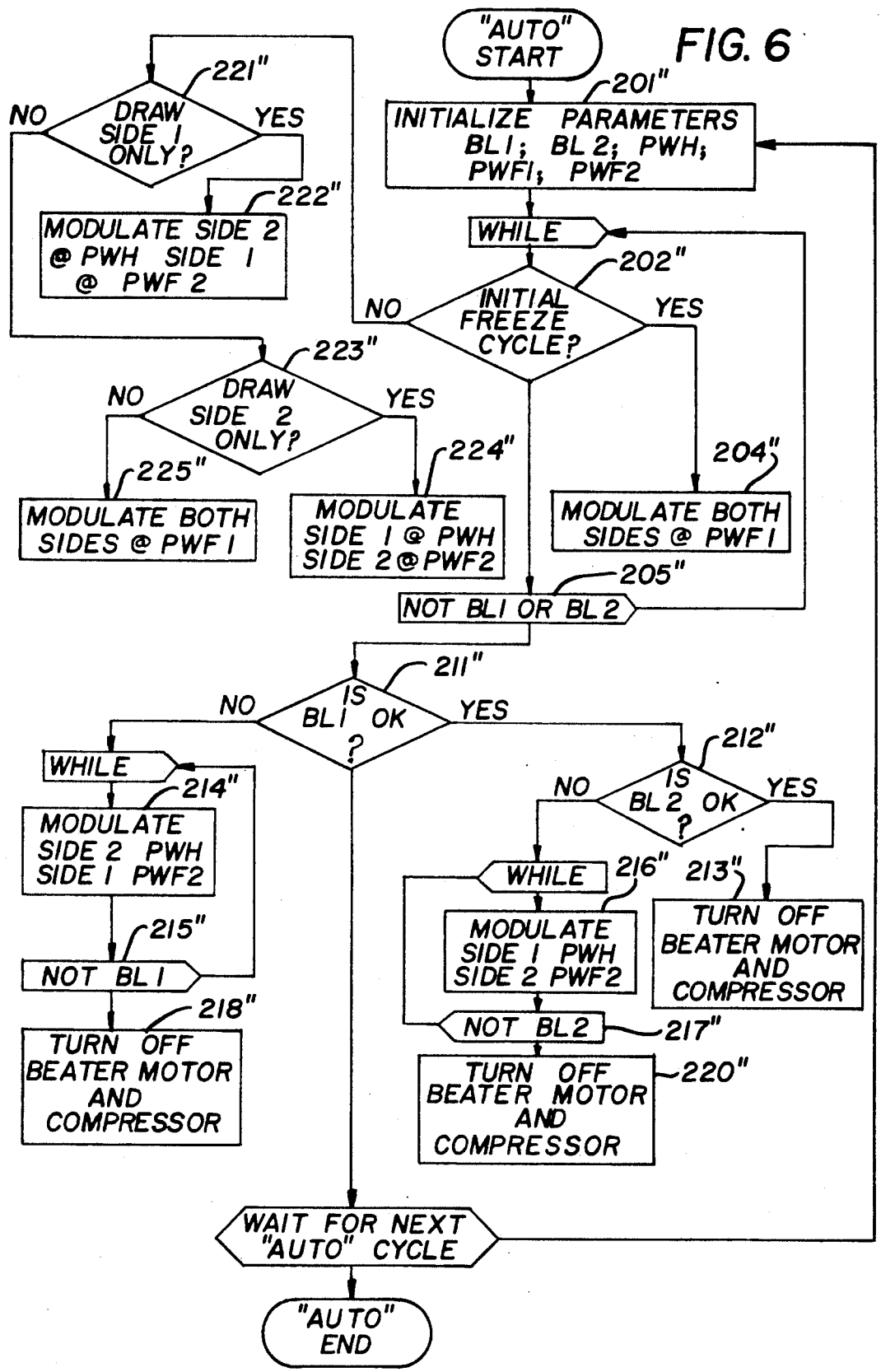

APPARATUS FOR FREEZING AND DISPENSING SEMI-FROZEN FOOD PRODUCTS HAVING DUAL FREEZING CHAMBERS AND METHOD

The present invention relates to an apparatus for freezing and dispensing semi-frozen food products. As product is dispensed from one end of a freezing chamber, unfrozen product ingredients are introduced at the other end of the freezing chamber and the time and amount of refrigeration required to freeze the incoming product ingredients to a servable product viscosity is dependant in large part on the rate at which product is dispensed from the freezing chamber. In apparatus having dual freezing chambers, product can be intermittently dispensed from either freezing chamber and the duration of each dispensing operation and the intervals between dispensing operations from the two chambers varies widely. Thus, in a given period of time, one freezing chamber may be subject to a number of dispensing operations and require a high rate of refrigeration while the other is subject to relatively few dispensing operations or even none at all and accordingly would require a relatively lower rate of refrigeration.

Apparatus have heretofore been made having two freezing chambers for freezing and dispensing semi-frozen food products using a single compressor to supply refrigerant to the evaporators for the two freezing chambers. However because of changes in rates at which product is dispensed, the two freezing chambers frequently require refrigeration at different rates and times. Controlling the rate of flow of refrigerant from a single compressor to accommodate the different refrigeration requirements in the two freezing chambers has presented some problems. In an attempt to overcome these problems, the assignee of the present invention has heretofore used separate refrigerant expansion control valves for each freezing chamber and also provided a solenoid on/off valve at the inlet of each evaporator and a solenoid on/off valve at the outlet of each evaporator to enable selective isolation of one or the other evaporators from the refrigeration system. This substantially increased the overall cost of the apparatus and the complexity of the controls required to operate the apparatus. Further, this prior refrigerant control system did not enable independant control of the rate of flow of refrigerant to the two evaporators when both freezing chambers required refrigeration at the same time.

In apparatus for freezing and dispensing frozen food products having two freezing chambers, it has been common practice to use separate drive motors for driving the beaters in the two chambers to enable driving of the beater in only one or the other or both freezing chambers, as desired. Such apparatus also used individual load sensors for sensing the torque or drive load on the motors for each chamber, to control supply of refrigerant to the associated freezing chamber. The use of separate beater drive motors and transmissions for connecting each drive motor to the beater in the associated freezing chamber, not only increased the cost of the apparatus but also increased the space required inside the cabinet such that it was difficult to make an apparatus having a size sufficiently small for a countertop unit.

U S. Pat. No. 4,869,072 discloses an apparatus for freezing and dispensing partially frozen beverages having two freezing chambers, a single compressor for refrigerating both freezing chambers, and a single drive motor for driving the beater in both chambers. The single drive motor drives the beater in both chambers concurrently and in continuous fashion. Refrigerant is supplied to each freezing chamber through a solenoid valve operated under the control of a torque sensing switch responsive to the torque load on the beater in the associated chamber. This apparatus is subject to the previously discussed problem of controlling flow of refrigerant from a single compressor to accomodate different refrigeration requirements in the two freezing chambers. In addition driving both beaters concurrently from a single beater drive motor introduces a further problem due to the heating of the product in the freezing chambers by the rotating beaters. When product is dispensed from only one freezing chamber, refrigerant is supplied to the evaporator for that chamber to refrigerate the incoming product, and will compensate for heating of the product by the beater in that chamber. However, refrigerant is not supplied to the other chamber to compensate for heating of the product caused by driving of the beater in the other chamber, until the viscosity in the other chamber falls below a minimum servable product viscosity.

SUMMARY OF THE INVENTION

It is an object of the present invention to provide an apparatus for freezing and dispensing semi-frozen food products having two freezing chambers and which uses a single beater drive motor and a single compressor, and which has an improved control system and method for controlling operation of the beater drive motor, the compressor and the supply of refrigerant to the two freezing chambers.

In accordance with one aspect of the present invention, a control means controls supply of refrigerant to the two freezing chambers during an initial freeze cycle by generating and applying periodic pulse width modulated signals having substantially equal duty cycles PWF1 to the solenoid valves associated with the evaporators for both freezing chambers, where the duty cycle PWF1 provides an effective refrigerant flow rate sufficient to increase the viscosity of the product in the freezing chamber to a servable product viscosity.

The apparatus has means for sensing dispensing of product from each freezing chamber and the control means also includes means operative when the product is dispensed from only one freezing chamber, for generating and applying a periodic pulse width modulated signal to the solenoid valve associated with said one freezing chamber having a duty cycle PWF2 and for generating and applying a periodic pulse width modulated signal to the solenoid valve associated with the other of the freezing chambers having a duty cycle PWH, where the duty cycle PWF2 provides an effective refrigerant flow rate sufficient to increase the viscosity of the product in the one freezing chamber to a servable product viscosity and the duty cycle PWH provides an effective refrigerant flow rate sufficient to substantially maintain the viscosity of the product in said other freezing chamber.

The apparatus also has means for sensing a condition of the product in the freezing chambers that is related to a minimum servable product viscosity and the control means further includes means operative when the product in one freezing chamber is below a minimum servable product viscosity for generating and applying a periodic pulse width modulated signal having a duty cycle PWF2 to the solenoid valve associated with said one of the freezing chambers and for generating and applying a periodic pulse width modulated signal having a duty cycle PWH to the solenoid valve associated with the other of the freezing chambers.

The sum of the duty cycles of the pulse width modulated signals applied to the solenoid valves associated with both freezing chambers in each period is preferably less than 100 percent of the period and the pulse width modulated signals are applied to the solenoid valves alternately during each period so that the supply of refrigerant to either freezing chamber is substantially independent of the supply to the other freezing chamber. The portion of each period during which the solenoid valves are open affects the head and suction pressure on the compressor and hence the temperature to which the product in the freezing chambers will be frozen. Different products require freezing to different temperatures to provide a desired minimum servable viscosity for that product and the combined duty cycles for both valves is selected so that the compressor operates at the necessary head and suction pressures for achieving the desired minimum servable product viscosity. Accordingly, the sum of the duty cycles PWF1 applied to the solenoid valves associated with both freezing chambers in each period during the initial freezing cycle is adjusted in a range between 60% and 90% of the period of the pulse width modulate signals to operate the refrigeration system at a preselected percent of its full capacity product freeze rate at which the system will refrigerate the product in the freezing chambers to the desired viscosity and temperature for serving. The sum of the duty cycles PWH and PWF2 applied to the solenoid valves associated with both the freezing chambers in each period during the refreeze cycles is preferably the same as the aforesaid sum of the duty cycles PWF1.

The product condition sensing means can comprise means individual to each freezing chamber for sensing the drive load for driving the beater in the associated chamber. In the preferred embodiment, the product condition sensing means includes means for sensing the combined drive load for driving both beaters and temperature sensing means individual to each freezing chamber for sensing the temperature of the product therein.

DESCRIPTION OF THE DRAWINGS

FIG. 6 is a flow chart of a program for operating the control system of FIG. 5.

DESCRIPTION OF THE FIRST PREFERRED EMBODIMENT

Figure 1:
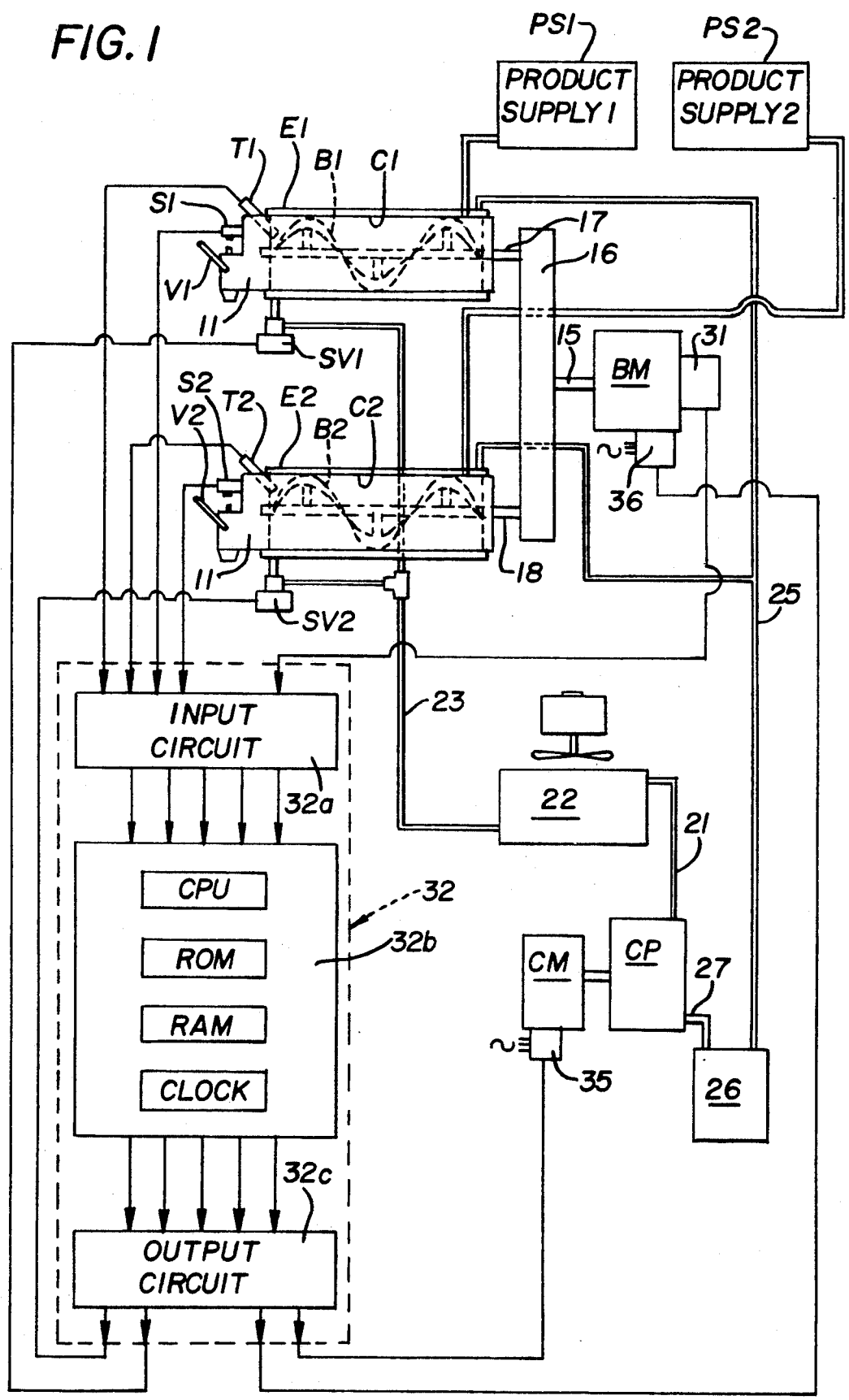
FIG. 1 is a diagram of an apparatus for freezing and dispensing semi-frozen food products and a control system therefor according to a first embodiment of this invention.

FIG. 1 illustrates an apparatus for freezing and dispensing semi-frozen food products having two freezing chambers C1 and C2 for dispensing food products of different flavors or types. The freezing chambers are commonly in the form of an elongated cylinder and respectively have beaters B1 and B2 mounted for axial rotation in the cylinders. Product to be frozen is supplied to the cylinders C1 and C2 from product supplies PS1 and PS2, and evaporators E1 and E2 extend around the freezing chambers C1 and C2 for refrigerating the product therein. The product supplies are generally arranged to supply a liquid comestible and an edible gas in proportions to provide a semi-frozen food product having the desired overrun. The liquid comestible may, for example, be of the type used to make soft ice cream, sherbert, shakes or ice slushes, and the gas can be air, nitrogen, carbon dioxide or a mixture thereof. As is conventional, the product supplies may also be refrigerated by suitable apparatus (not shown) to pre-cool the liquid therein to preselected above freezing temperatures.

Selectively operable dispensing valve means are provided for controlling dispensing of semi-frozen product from the freezing chambers, preferably at the end of the cylinders remote from the product supply inlet. As diagrammatically illustrated in FIG. 1, valves V1 and V2 are provided in heads 11 at a discharge end of the cylinder for respectively dispensing semi-frozen product from chambers C1 and C2. It is also common practice in dual chamber apparatus to provide a third dispensing valve (not shown) which is arranged to dispense product from both freezing chambers simultaneously, when a mixture of the products from the two freezing chambers is desired.

Means are provided for producing a signal when product is dispensed from either freezing chamber. This means may comprise switches S1 and S2 arranged to sense when a dispensing valve is open to dispense product from freezing chambers C1 and C2 respectively. The dispense sensing means can also be arranged to sense other conditions that change when product is dispensed from a freezing chamber, such as the infeed of product from the associated product supply as occurs when the dispensing valve is opened, or the change in vicosity of the product in the freezing chamber as occurs when the dispensing valve is opened. As diagrammatically shown, the switches are positioned so as to be actuated when the associated dispensing valve is opened or raised to dispense a product. Some apparatus have a third valve for dispensing product simultaneously from both freezing chambers, and in such apparatus the third dispensing valve is arranged in a manner well known in the art to operate both switches S1 and S2 simultaneously when the third valve is opened to dispense product from both freezing chambers.

A single beater drive motor BM is provided for driving both beaters B1 and B2. As shown, drive motor BM is connected to an input shaft 15 of a power transmission 16 having dual output shafts 17 and 18 respectively connected to the beaters B1 and B2. The beater drive motor, when energized, drives both beaters concurrently.

Refrigerant is supplied to the evaporators E1 and E2 for both freezing chambers from a single compressor CP driven by a compressor motor CM. As diagrammatically illustrated, the compressor CP has high pressure outlet line 21 connected to a condenser 22 and the outlet of the condenser is connected through a high pressure refrigerant supply line 23 to on/off type solenoid valves SV1 and SV2 respectively arranged to control the supply of refrigerant to evaporators E1 and E2. Evaporators E1 and E2 are otherwise connected through a low pressure refrigerant return line 25 and an accumulator 26 to the suction side 27 of the compressor. The solenoid valves SV1 and SV2 are of the type which can be rapidly cycled between an open position passing flow of refrigerant to an associated evaporator and a closed position blocking flow of refrigerant and the solenoid valves are pulse width modulated in a manner described more fully hereinafter to control refrigeration of the associated freezing chamber.

Product condition sensing means are provided for sensing a condition of the product in the freezing chambers that is related to a minimum servable product viscosity. In the embodiment of FIG. 1, the product condition sensing means includes a load sensing means 31 for sensing the combined drive load for driving both the beaters B1 and B2 concurrently, and a temperature sensing means T1 and T2 respectively arranged to sense the product temperature in the freezing chambers C1 and C2. Temperature sensors can sense the temperature of the product only in a localized area of the freezing chambers and the temperature sensors are preferably arranged to sense the product temperature adjacent the outlet or discharge end of the freezing chambers. The temperature sensors may, for example, comprise thermistors mounted in the discharge heads 11 and which extend into a cavity in the head that communicates with the product in the freezer chamber.

A control means 32 is provided for controlling operation of compressor drive motor beater drive motor and the solenoid valves. The control means 32 includes an input circuit 32a, a programmable controller 32b and an output circuit 32c. The input circuit 32a is electrically connected to the dispense switching switches S1 and S2 and is also connected to the temperature sensers T1 and T2 to receive signals therefrom. The input circuit is also connected to the load sensor 31 that senses the combined load on the beater motor for driving both beaters B1 and B2 concurrently. The programmable controller 32b is connected between the input circuit 32a and the output circuit 32b and executes preset signal processing and/or calculations with respect to signals fed from the input circuit 32a and thereby generates secondary signals fed to the output circuit 32c. The output circuit generates control signals in accordance with the secondary signals and the output circuit is electrically connected to the solenoid valves SV1 and SV2; to a compressor contactor 35 for the compressor motor, and to a beater contactor 36 for the beater motor. The solenoid valves SV1 and SV2 and the compressor motor and beater motor are controlled by way of signals applied to the these devices from the output circuit 32c.

The programmable controller 32b includes a central processing unit (CPU) read only memory (ROM), a random access memory (RAM), and a clock generator (Clock). The clock generator is connected to the CPU, the ROM and the RAM and, during signal processing, the CPU electronically scans a control program stored in memory and reads the status of the inputs and executes commands to the appropriate output based on input conditions and what they mean to the stored program. The CPU also performs other functions such as math operations, timing, and counting. The programmable controller 32b may, for example, comprise a microcontroller such as marketed by Intel Corporation, Santa Clara, Calif. No. 8098. The 8098 microcontroller has an on-chip A/D converter for converting analog signals to digital signals and a plurality of on-chip pulse width modulated outputs. Other microprocessors or micro- controllers can be used and discrete A/D converters and/or pulse width modulators provided, if required.

The dispense sensing switches S1 and S2 are preferably on/off type switches which provide a digital signal to the input circuit when its associated dispense valve is open. In the embodiment of FIG. 1, the temperature sensors are of a type such as a thermistor which provides an analog signal correlative with the temperature of the product sensed by the temperature sensor and these temperature sensors apply an analog signal to the input circuit. The beater load sensing means 31 can be of various known types and may, for example, comprise a torque sensitive coupling in the shaft 15 that produces a digital signal when the drive torque reaches a value correlative with a desired servable product viscosity. In the embodiment of FIG. 1, the load sensor 31 is preferably of a type that senses a current or voltage condition in the beater drive motor, which is correlative with the combined drive load for driving both beaters. The solenoid valves SV1 and SV2 are adapted to rapidly move between closed and open positions and back, and the period of the pulse width modulated signals and the duty cycles of the signals applied to the valves SV1 and SV2 is selected so that the valves move between a fully closed and fully opened position and back during each period. In order to enable independent control of the refrigerant supplied to the evaporators E1 and E2, the programmable controller 32 is arranged to apply pulse width modulated signals to the solenoid valves SV1 and SV2 alternately during each period, and the sum of the duty cycles of the pulse width modulated signals applied during each period is made less than 100% of the period, to provide time between the duty cycles of the two valves sufficient to allow one valve to close before the other valve opens. Since each valve closes before the other opens, opening of the valve associated with one evaporator does not affect the flow of refrigerant to the other evaporator.

Different products have different thermal transfer rates and different freezing points. The total time that the solenoid valves are open during each period affects the head and suction pressures on the compressor and hence the temperature to which the product can be frozen in the freezing chambers. The combined duration of the pulse width modulated signals applied to both solenoid valves during each period is made adjustable in a range from about 60% to 90% of the period of the pulse width modulated signals to operate the refrigeration system at a preselected percent of its full capacity product freeze rate at which the system will freeze the product in the freezing chambers to the desired servable product viscosity. In general, increasing the combined duty cycles toward the upper end of the range effects freezing of the product to a lower temperature and provides a higher product viscosity. As pointed out more fully hereinafter, the duty cycles of pulse width modulated signals for the solenoid valves SV1 and SV2 are changed in different operating modes. However the sum of the duty cycles of the pulse width modulated signals applied to the valves SV1 and SV2 during each period is preferably substantially the same in each of the different operating modes.

The proper percent of full capacity product freeze rate can be readily determined by first operating the apparatus in an initial freeze mode with the duty cycles PWF1 preset at a preselected percent of full capacity product freeze rate and the duty cycles PWF1 then increased or decreased as required to freeze the product to the desired minimum servable product viscosity for that product. The solenoid valves are operated alternately during each period of the pulse width modulated signals and the sum of the duty cycles of pulse width modulated signals PWF1 accordingly equals X percent of the period or X percent of the full capacity product freeze rate. The apparatus is preferably operated in all of its modes at the same X percent of the full capacity product freeze rate for the product. Thus, PFW1, is preset so that 2 times PWF1 substantially equal X percent of the full capacity product freeze rate, and PWH plus PWF2 are preferably preset to substantially equal the same X percent of the full capacity product freeze rate.

PWH is the duty cycle required to produce an effective refrigeration flow rate sufficient to compensate for heating of the product in the freezing chamber due to rotation on the beater therein. The duty cycle PWH is low as compared to PWF1, and can be empirically determined, for example by continuosly operating the beater in a freezing cylinder filled with the product to the dispensed and adjusting the duty cycle until the product is maintained at the desired viscosity. It has been found that for many products, PWH is in the order of nine to twelve percent of the full capacity product freeze rate of the apparatus. When the solenoid valve associated with one freezing chamber is modulated at a duty cycle PWH, the solenoid valve associated with the other freezing chamber is preferably modulated at a duty cycle PWF2 substantially equal to X percent of the full capacity freeze rate minus PWH, so that the sum of the duty cycles PWH and PWF2 substantially equal X percent of the full capacity product freeze rate.

Figure 2:
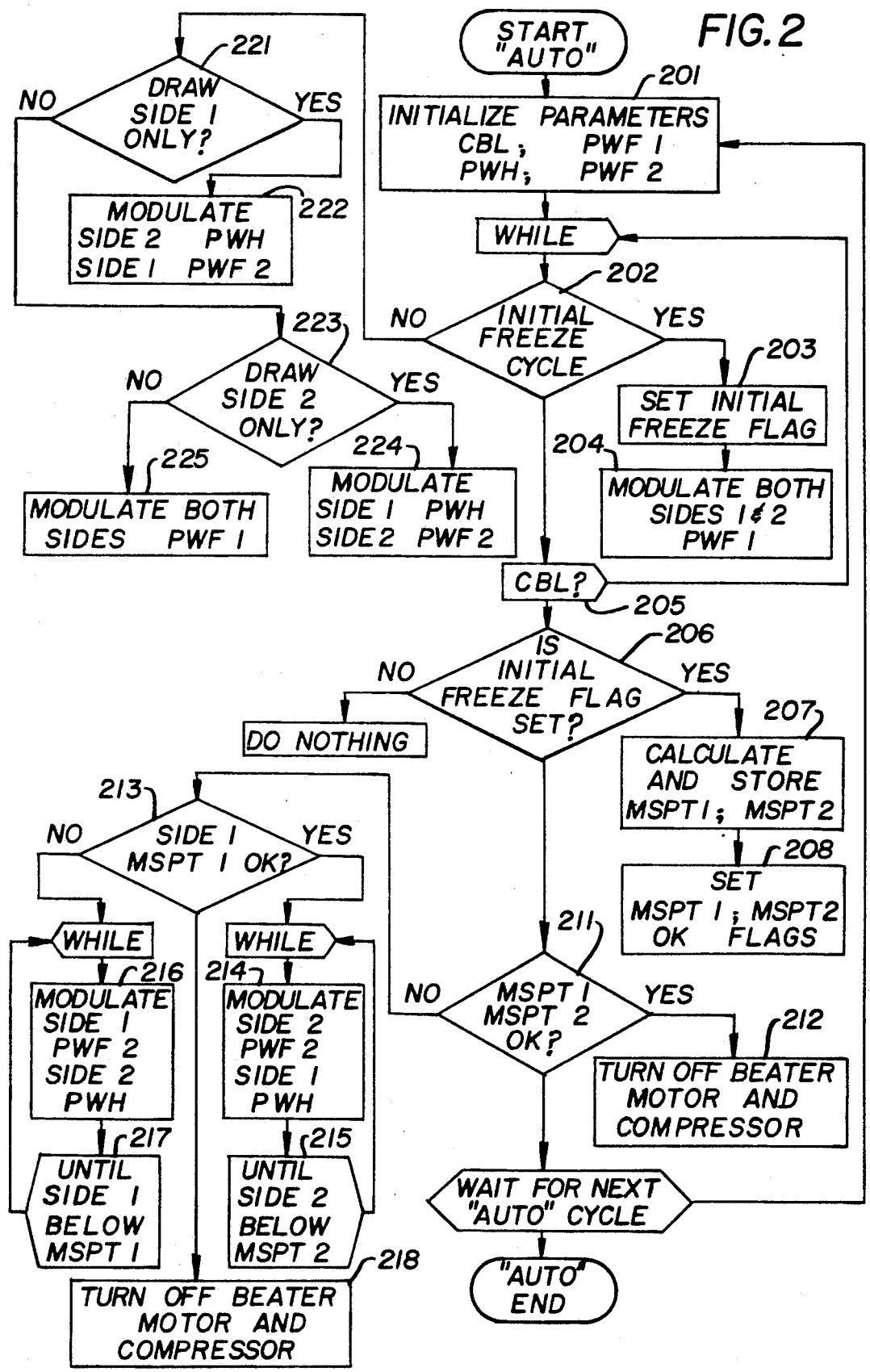
FIG. 2 is a flow chart of a program for operating the control system of FIG. 1.
Figure 3A:
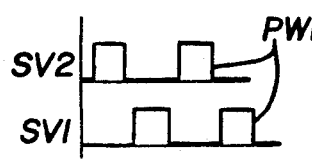
FIGS. 3a, 3b and 3c are graphs illustrating the pulse width modulated signals applied to the solenoid valves associated with both freezing chambers, under different operating modes.

The control circuit 32 operates in accordance with a program stored in the RAM within the programmable control 32b. In the flow charts, the freezing chamber C1 evaporator E1, dispense valve V1 and solenoid valve SV1 are collectively referred to as side 1 and the freezing chamber C2, evaporator E2 dispense valve V2 and solenoid valve SV2 are collectively referred to as side 2. In FIG. 2 is a flow chart of a program for operating the apparatus of FIG. 1. An "auto" cycle is started as by closing of a switch, (not shown) for example at the beginning of the day of operation of the freezing and dispensing apparatus. An "auto" cycle can also be started by a timer (not shown) at preselected times during the day or at a preselected time interval, for example a preset number of minutes, after the last preceeding dispensing operation. As shown in FIG. 2, a first step 201 of the program initializes parameters and sets a reference combined beater load CBL and reference duty cycles PWF1, PWF2 and PWH. In the following step 202, the control means determines if it is an initial freeze cycle and, if it is, the control sets an initial freeze flag as indicated in step 203 and in step 204 proceeds to generate and apply periodic pulse width modulated signals having substantially equal duty cycles PWF1 to the solenoid valves SV1 and SV2 associated with both freezing chambers. For reasons previously described, the pulse width modulated signals are preferably applied to the solenoid valves associated with the two freezing chambers alternately during each period, and the duty cycles PWF1 are each less than 50% of the period as graphically illustrated in FIG. 3a. Operation of the apparatus in this initial freeze mode continues until the program in step 205 determines that the combined beater load outputted from load sensor 31 reaches the preset reference value CBL stored in the memory of the programmable controller. Since the duty cycles of the pulse width modulated signals applied to both solenoids is the same during the initial freezing cycle, the product in both freezing chambers will be balanced, that is have substantially the same viscosity and temperature when the combined beater load reaches the reference CBL at the completion of one initial freeze cycle. The program determines in step 206 if one initial freeze flag has been set and, if it has, the program operates the in step 207 to derive the current value of the product temperatures from the signals outputed by temperature sensors T1 and T2 and to calculate and store minimum servable product reference temperatures MSPT1 and MSPT2 respectively correlative with the current value of the product temperatures outputed by sensors T1 and T2, and the program proceeds in step 208, to set flags for reference temperatures MSPT1 and MSPT2. By calculating the reference temperatures MSPT1 and MSPT2 from the signals outputed from the temperature sensors at the completion of the initial freeze cycle, the reference temperatures compensate for any differences in the signal outputed from the two temperature sensors at the same product temperature. Further if the reference combined beater load CBL is changed to a new reference CBL, the program automatically adjusts the reference temperatures MSPT1 and MSPT2 to the temperature signals outputed from the sensors T1 and T2 at the new reference CBL.

The reference temperatures MSPT1 and MSPT2 are subsequently used to determine if the current product temperature in the respective cylinders C1 and C2 are at or below a minimum servable product viscosity, and MSPT1 and MSPT2 are preferably calculated and set so as to be slightly lower, for example about one degree, lower than the current value of the product temperatures derived from the signal outputed by the temperature sensors T1 and T2 at the time the combined beater load reaches the reference combined beater load CBL.

Figure 3B:
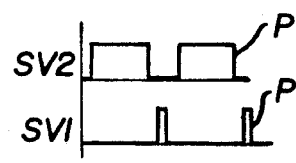
Figure 3C:
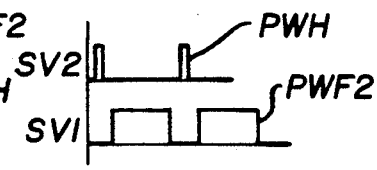

In step 211, the control compares the current value of the temperatures outputed from temperature sensors T1 and T2 with the reference temperatures MSPT1 and MSPT2, and, if the current temperatures are at or below the respective reference temperatures, the control operates in step 212 to turn off the beater motor and compressor motor. If the current product temperatures in both freezing chambers are not at or below the respective reference temperatures, the control continues operation of the compressor and beater motor and in step 213 compares the current temperature signal outputted from sensor T1 with the reference temperature MSPT1. If the product temperature in freezing chamber C1 is at or below the reference temperature MSPT1, the control operates in step 214 to modulate the signals supplied to solenoid valve SV1 at a duty cycle PWH and modulate the signals supplied to solenoid valve SV2 at a duty cycle PWF2 as graphically illustrated in FIG. 3b. The duty cycle PWH is selected to provide an effective refrigerant flow rate to the evaporator associated with freezing chamber C1 which is sufficient to substantially maintain the viscosity of the product in freezing chamber C1 while the beater is rotating therein. The duty cycle PWF2 provides an effective refrigerant flow rate substantially greater than PWH and sufficient to increase the viscosity of the product in the other freezing chamber C2. The control continues in this mode until step 215 determines that the product temperature in freezing chamber C2 is below the reference temperature MSPT2 for that chamber. On the other hand, if the temperature in freezing chamber C1 is not at or below the reference MSPT1, the control operates in step 216 to modulate the signal applied to solenoid valve SV1 at a duty cycle PWF2 and to modulate the solenoid valve SV2 associated with the freezing chamber C2 at a duty cycle PWH as graphically illustrated in FIG. 3c, until the control in step 217 determines that the current product temperature outputed by the signal from the sensor T2, is below the reference temperature MSPT1.

Product can be intermittently dispensed from either freezing chamber and the duration of each dispensing operation and the intervals between dispensing operations from the two chambers varies widely. The control system is operative in response to signals outputed by the dispense switches S1 and S2, to turn on the compressor and beater motor, and to modulate the signals applied to the solenoid valves while one or the other draw switch or both draw valves are open. In step 221, the control determines if only draw switch S1 is open and, if it is, the control in step 222 modulates the signal applied to valve SV1 at a duty cycle PWF2 and modulates the signal applied to valve SV2 associated with the other freezing chamber at a duty cycle PWH. In step 223, the control determines if the draw is from only the second freezing chamber and, if it is, it proceeds in step 224 to modulate the signals applied to solenoid valve SV2 at a duty cycle PWF2 and modulate the signal applied to the solenoid valve SV1 at a duty cycle PWH. If the draw is not from side one only or side 2 only, the control in step 223 determines that the draw is from both the freezing chambers and in step 225 operates to modulate the solenoid valves SV1 and SV2 at the same duty cycles PWF1 to refrigerate both freezing chambers at substantially the same rate. Step 225 is also executed when an "auto" cycle is initiated by a timer at preselected times during the day or at a preselected time interval after the last dispensing operation. The control system is operative to continue operation of the compressor and beater motor and to modulate the control signals in accordance with steps 222, 224 or 225 dependent on whether the last draw signal indicated that product was dispensed from side 1, side 2, or both sides, until the control determines in step 205 that the combined beater load derived from load sensor 31 exceeds the reference combined beater load CBL. When the current value of the beater load from load sensors 31 reaches the reference combined beater load CBL, the control system continues operation of the compressor and beater motor and proceeds in step 211 to compare the current value of the product temperatures from sensors T1 and T2 to the minimum servable product reference temperatures MSPT1 and MSPT2. If the temperature outputed from sensors T1 and T2 are at or below the respective reference temperature system in step 212 turns off the beater motor and compressor motor. If temperatures outputed from sensors T1 and T2 are not at or below the respective reference temperatures, the control system continues operation of the compressor and beaters and modulates signals applied to the solenoid valves SV1 and SV2 in the manner previously described in connection with steps 213-217 and in step 218 turns off the compressor and beater motors.

Figure 4:
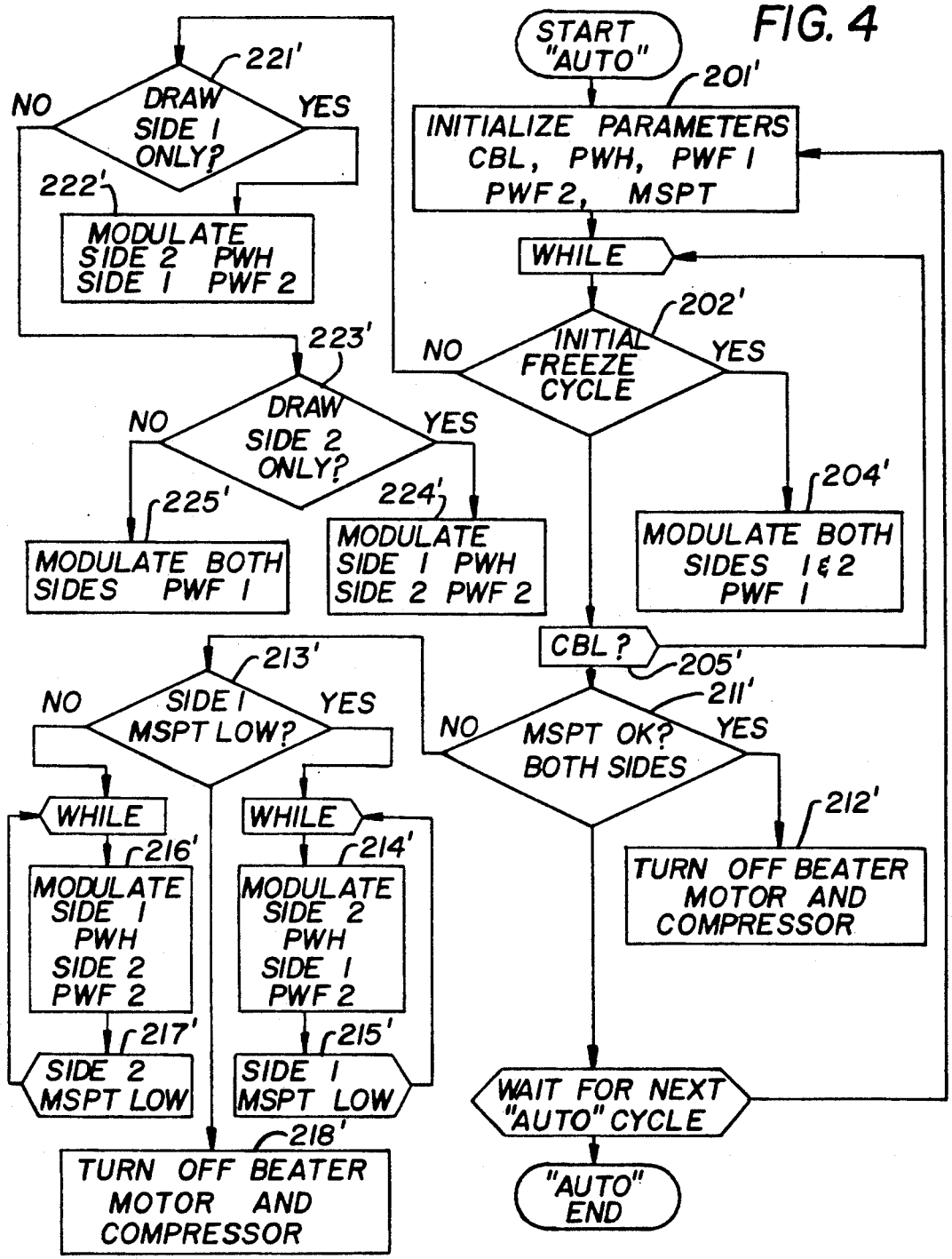
FIG. 4 is a flow chart of a modified program for operating the control system of FIG. 1.

In the embodiment of FIGS. 1 and 2, the reference temperatures MSPT1 and MSPT2 are calculated for the cylinders C1 and C2 when the combined beater loads reaches the reference beater load CBL at the end of the initial freezing cycle. In some apparatus, it is possible to select and/or provide compensation means for two temperature sensors T1 and T2 so that they produce substantially the same signal output to the controller, when the product temperatures are the same. FIG. 4 illustrates a modified flow chart for operating the apparatus of FIG. 1. As shown in FIG. 4, the first step 201' initializes parameters and sets a reference combined meter load CBL; and pulse width duty cycles PWH, PWF1 and PWF2, and a reference minimum servable product temperature MSPT. The flow diagram in FIG. 4 is similar to that in FIG. 2 and like numerals followed by the postcript ' are used to designate corresponding steps. When an auto cycle is initiated, the compressor and beater motors are operated and the control system determines in step 202' whether it is an initial freeze cycle. If it is the initial freeze cycle, the control system operates in step 204' to modulate the solenoid valves SV1 and SV2 at substantial equal duty cycles PWF1, and operation in this initial freeze mode continues until the program in step 205" determines than the current value of the combined beater load outputed sensor 31 reaches the reference combined beater load CBL. In step 211', the control determines whether the product temperatures currently outputed from temperature sensors T1 and T2 are at or lower than the minimum servable product reference temperatures MSPT and, if yes, operates in step 212' to turn off the beater motor and compressor motor. If the current temperature signals outputed by sensors T1 and T2 are not both equal to the minimum servable product reference temperature MSPT, the control operates in steps 213'-218' in the manner previously described in connection with steps 213-218 in FIG. 2. When product is dispensed from one freezing chamber or the other freezing chamber or both freezing chambers, the control system operates in steps 221'-225' in the manner previously described in connection with steps 221-225 in FIG. 2. Thus, the flow chart of FIG. 4 differs from that in FIG. 2 primarily in presetting the minimum servable product reference temperature MSPT rather than calculating individual reference minimum servable product temperatures for freezing chambers C1 and C2.

Figure 5:
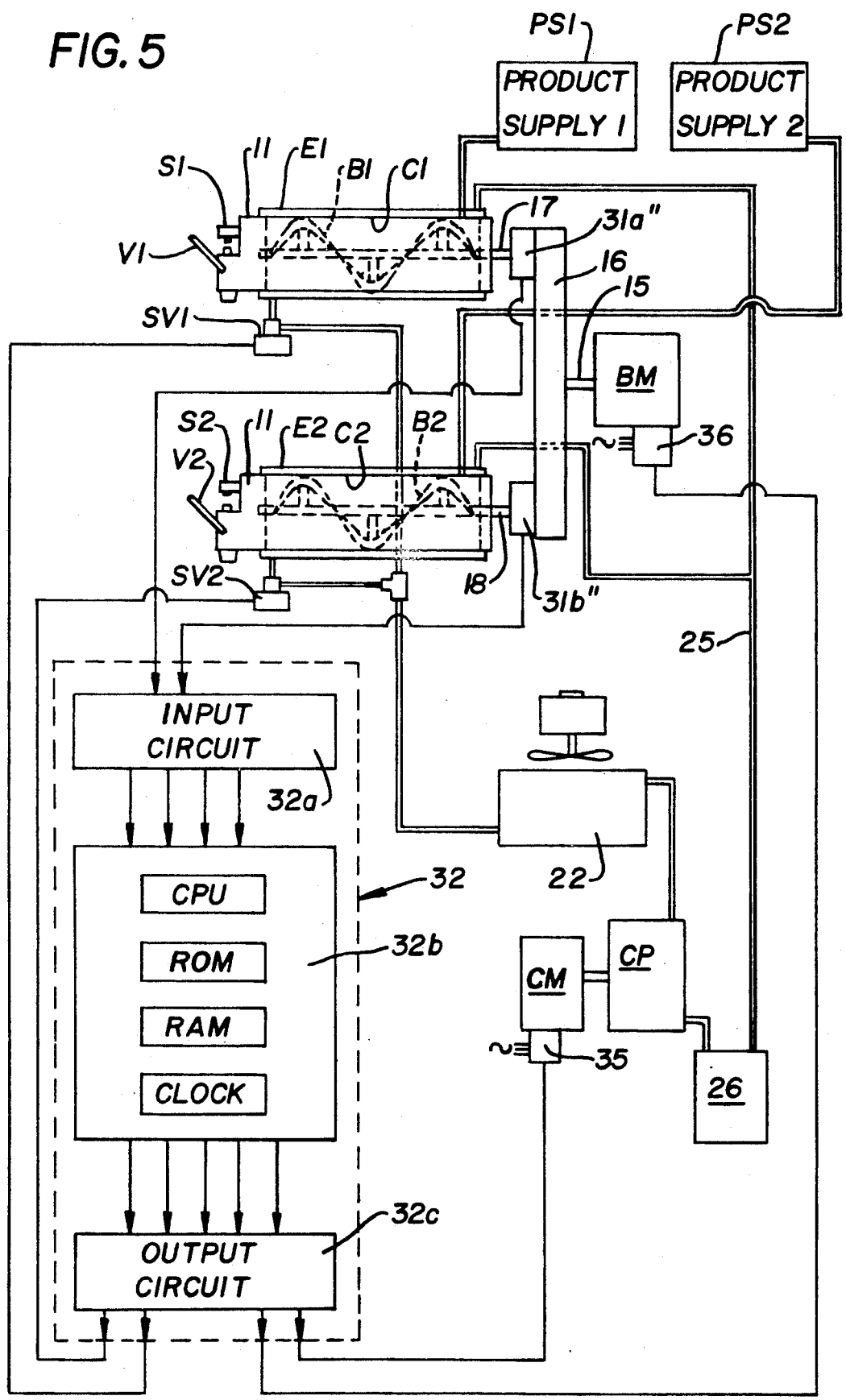
FIG. 5 is a diagram of a refrigerating system according to a further embodiment of this invention.

The apparatus for freezing and dispensing semifrozen food products and the control system therefor illustrated in FIG. 5 is generally the same as that illustrated in FIG. 1 and like numerals are used to designate the same parts and like numerals followed by the postscript '' are used to designate modified parts. In general, the apparatus of FIG. 5 differs from that i FIG. 1 essentially in that it uses two beater load sensors 31a'' and 31b'' in lieu of the combined beater load sensor 31 and temperature sensors T1 and T2 in FIG. 1.

FIG. 6 is a flow chart of a program for operating the apparatus in FIG. 5. An "auto" cycle is started by closing of a switch (not shown) for example at the beginning of the day of operation of the freezing and dispensing apparatus. A "auto" cycle can also be started by a timer (not shown) at preselected times during the day or at a preselected time interval for example a preset number of minutes after the last preceeding dispensing operation. As shown in FIG. 6, the first step 201'' of the program initalizes parameters and sets reference beater loads BL1 and BL2, and duty cycles PWH, PWF1 and PWF2. For products having the same minimum servable product viscosity, the In step 202'', the control means determines if it is an initial freeze cycle and, if it is, the control in step 204" generates and applies periodic pulse width modulated signals having substantially the same duty cycle PWF1 to the solenoid valves SV1 and SV2 associated with both freezing chambers. For reasons previously described, the pulse width modulated signals are preferably applied to the solenoid valves associated with the two freezing chambers alternately during each period and the duty cycles PWF1 are each less than 50% of the period. Operation of the apparatus in this initial freeze mode continues until the control in step 205" determines that either the beater load sensed by sensor 31a" or the beater load sensed by sensor 31b" exceeds the respective reference beater load BL1 or BL2. When either beater load BL1 or BL2 is exceeded, the program in step 211" determines if the beater load for driving beater B1 in freezing chamber C1 is at or above the reference beater load BL1. If the load on the beater B1 is not at or above the reference beater load BL1, the control continues operation of the compressor and in step 214" generates and applies pulse width modulated signals having a duty cycle PWF2 to the solenoid valve associated with chamber C1 and pulse width modulated signals having a duty cycle PWH to the solenoid valve SV2 associated with cylinder C2. The program continues to operate the apparatus in this mode until the control in step 215" determines that the beater load outputed from sensor 31a" exceeds the reference beater load BL1, and the control then turns off the beater motor and compressor motor as indicated in step 218". If the program determines in step 211" that the drive load outputed from load sensor 31a" is at or above the reference drive load BL1, the program proceeds to step 212" and determines if the load outputed from sensor 31b" is at or above reference beater load BL2 and, if yes, the control in step 213" shuts off the beater motor and compressor motor. If the load outputed by load censor 31b" is not at or above the reference beater load BL2, the program operates in step 216" to generate and apply a pulse width modulated signal having a duty cycle PWF2 to the solenoid valve SV2 associated with freezing chamber C2, and to generate and apply a pulse width modulated signals having a duty cycle PWH to the solenoid valve SV1 associated with the freezing chamber C1. The control in step 217" continues operation in this mode until the beater load output from sensor 31b" exceeds the reference beater load BL2 and the control then operates in step 220" to turn off the beater motor and compressor.

As in the preceding embodiments, product can be intermittently dispensed from either freezing chamber and the duration of each dispensing operation and intervals between the dispensing operation from the two chambers varies widely. The control system in FIG. 6 is operative in response to signals outputed by the dispense switches S1 and S2, to turn on the compressor and beater motors, and to modulate the signals applied to the solenoid valves S1 and S2 while one or the other of the draw valves are open. In step 221", the control determines if only draw switch SV1 is open and, if it is, the control in step 222" generates and applies a pulse width modulated signal to valve SV1 having a duty cycle PWF2 and generates and applies a pulse width modulated signal having a duty cycle PWH to the solenoid valve associated with freezing chamber C1. If the draw switch S1 is not actuated, then the control determines in step 223" if only the draw switch S2 is actuated. If only the draw switch S2 is actuated, the control, in step 224", generates and applies a pulse switch modulated signal having a duty cycle PWF2 to the solenoid valve SV2 and generates and applies a pulse width modulated signal having a duty cycle PWH to the solenoid valve SV1. If, in steps 221" and 223", the control determines that the draw is not from only freezing chamber C1 or from only freezing chamber C2, then it follows that the draw is from both freezing chambers C1 anc C2 or that the "auto" cycle has been initiated by the timer. Under these conditions, the control operates in step 225" to generate and apply pulse width modulated signals having substantial equal duty cycles PWF1 to the solenoid valves associated with both freezing chambers. The control continues operation of the compressor and applies pulse with modulated signals to the solenoid valves SV1 and/or SV2 in accordance with steps 222", 224" or 225" until the control in step 205" determines that the beater load sensed either of the load sensors 31a" or 31b' exceeds the respective reference beater load BL1 or BL2. The control thereafter continues operation in the manner previously described in connection with steps 211"-220" until the beater loads outputed from sensors 31a and 31b reach the reference beater loads BL1 and BL2. In the flow chart of FIG. 6, both the compressor motor and beater motors are turned off in steps 213", 218", and 220". In some apparatus such as slush drink vending apparatus, the beater motor can be operated in continuous fashion to maintain the ice particles in suspension.

The embodiments of the invention in which an exclusive property or privilege is claimed are defined as follows:

1. In a soft-serve dispensing apparatus including two freezing chambers each having an evaporator and a rotary beater, dispensing valve means for dispensing semi-frozen product from the freezing chambers, dispense sensing means for sensing when product is dispensed from each freezing chamber, product condition sensing means for sensing a condition of the product in the freezing chambers that is related to a minimum servable product viscosity; product supply means for supplying unfrozen product to the freezing chambers, refrigeration producer means including a compressor having a compressor drive motor, a condenser, a high pressure refrigerant supply means including a refrigerant expansion control means individual to each evaporator means and low pressure refrigerant return line means for returning refrigerant from both evaporator means to the compressor, and beater drive means for driving the beaters, the improvement comprising, the beater drive means has a single drive motor and power transmission means for connecting the drive motor to the beaters in both freezing chambers to drive both beaters concurrently, said refrigerant expansion control means each comprising an on-off solenoid valve, means for starting an auto-cycle operation of the apparatus, and control means for controlling operation of the compressor drive motor and the beater drive motor and the solenoid valves, (a) said control means including means responsive to starting an auto-cycle of the apparatus for operating the apparatus in an initial freeze mode, said control means including means operative in the initial freeze mode for generating and applying periodic pulse width modulated signals having substantially equal duty cycles PWF1 to the solenoid valves associated with the evaporators for both freezing chambers where the duty cycle PWF1 provides an effective refrigerant flow rate sufficient to increase the viscosity of the product in the freezing chambers, (b) said control means including means responsive to the dispense sensing means for operating apparatus in a first refreeze mode, the control means including means operative in the first refreeze mode when product is dispensed from one of the freezing chambers for generating and for applying a periodic pulse width modulated signal to the solenoid valve associated with said one of the freezing chambers having a duty cycle PWF2 and for generating and applying a periodic pulse width modulated signal to the solenoid valve associated with the other of the freezing chambers having a duty cycle PWH, where the duty cycle PWF2 provides an effective refrigerant flow rate sufficient to increase the viscosity of the product in said one freezing chamber and the duty cycle PWH provides an effective refrigerant flow rate sufficient to substantially maintain the viscosity of the product in said other freezing chamber, (c) said control means further including means responsive to said product condition sensing means for operating the apparatus in a second refreeze mode, said control means including means operative in said second refreeze mode when the product in one freezing chamber is below a minimum servable product viscosity for generating and applying a periodic pulse width modulated signals having a duty cycle PWF2' to the solenoid valve associated with said one of the freezing chambers and for generating and applying a periodic pulse width modulated signals having a duty cycle PWH' to the solenoid valve associated with the other of the freezing chambers where the duty cycle PWF2' provides an effective refrigerant flow rate sufficient to increase the viscosity of the product in said one freezing chamber and the duty cycle PWH' provides an effective refrigerant flow rate to substantially maintain the viscosity of the product in said other freezing chamber.

2. The combination of claim 1 wherein the sum of the duty cycles of the pulse width modulated signals applied to the solenoid valves associated with both freezing chambers during each period is less than 100% of the period and the signals are applied to the solenoid valves alternately during each period.

3. The combination of claim 1 wherein the pulse width modulated signals are applied to the solenoid valves associated with the two freezing chambers alternately during each period and the duty cycles PWF1 are each less than 50% of the period.

4. The combination of claim 3 wherein the sum of the duty cycles PWF1 applied to the solenoid valves associated with both freezing chambers during each period is in a range between 60% to 90% of the period of the pulse width modulated signals.

5. The combination of claim 1 wherein the duty cycle PWH is substantially shorter than the duty cycle PWF1 and the duty cycle PWF2 is at least as long as the duty cycle PWF1.

6. The combination of claim 1 wherein the sum of the duty cycles PWF1 applied to the solenoid valves associated with both freezing chambers in a range between 60% to 90% of the period of the pulse width modulated signals and the sum of the duty cycles PWH and PWF2 is substantially equal to the sum of the duty cycles PWF1.

7. The combination of claim 1 wherein the control means further includes means operative in said first refreeze mode and responsive to the dispense sensing means when product is dispensed concurrently from both freezing chambers for generating and applying pulse width modulated signals having said substantially equal duty cycles PWF1 to the solenoid valves associated with both freezing chambers.

8. The combination of claim 1 wherein the product condition sensing means includes means individual to each freezing chamber for sensing the temperature of the product therein.

9. The combination of claim 1 wherein said product condition sensing means includes means individual to each freezing chamber for sensing the drive load for driving the beater in the associated chamber.

10. In a soft-serve dispensing apparatus including two freezing chambers each having an evaporator and a rotary beater, dispensing valve means for dispensing semi-frozen product from the freezing chambers, dispense sensing means for sensing when product is dispensed from each freezing chamber, product supply means for supplying unfrozen product to the freezing chambers, refrigeration producer means including a compressor having a drive motor, a condenser, a high pressure refrigerant supply means including a refrigerant expansion control means individual to each evaporator means and low pressure refrigerant return line means for returning refrigerant from both evaporator means in the compressor, and beater drive means for driving the beaters, the improvement comprising, the beater drive means has a single drive motor and power transmission means for connecting the drive motor to the beaters in both freezing chambers to drive both beaters concurrently, beater drive load sensing means responsive to the combined drive load for driving the beaters in both freezing chambers, product temperature sensing means individual to each chamber for sensing a product temperature condition correlative with a minimum servable product viscosity, said refrigerant expansion control means each comprising an on-off solenoid valve, means for setting a combined beater load threshold correlative with the desired viscosity for servable product in the freezing chambers, means for starting operation of the apparatus, and control means for controlling operation of the compressor drive motor and the beater drive motor and the solenoid valves, (a) said control means including means responsive to starting of the apparatus for operating the apparatus in an initial freeze mode, said control means including means operative in the initial freeze mode for energizing the compressor drive motor and beater drive motor and for generating and applying pulse width modulated signals having substantially equal duty cycles PWF1 to the solenoid valves associated with the evaporators for both freezing chambers and for continuing operation in the initial freeze mode until the combined drive load exceeds the load threshold, where the duty cycle PWF1 provides an effective refrigerant flow rate sufficient to increase the viscosity of the product in the freezing chambers, (b) said control means including means responsive to a dispense signal from the dispense sensing means associated with one of the freezing chambers for operating apparatus in a first refreeze mode, the apparatus including means operative in the first refreeze mode for energizing the compressor drive motor and the beater drive motor and for generating and for applying a periodic pulse width modulated signal to the solenoid valve associated with said one of the freezing chambers having a duty cycle PWF2 and for generating and applying a periodic pulse width modulated signal to the solenoid valve associated with the other of the freezing chambers having a duty cycle PWH and for continuing operation in the first refreeze mode until the combined beater load exceeds said load threshold, where the duty cycle PWF2 provides an effective refrigerant flow rate sufficient to increase the viscosity of the product in said one freezing chamber and the duty cycle PWH provides an effective refrigerant flow rate sufficient to substantially maintain the viscosity of the product in said other freezing chamber, (c) said control means further including means responsive to said temperature sensing means for operating the apparatus in a second refreeze mode, said control means including means operative in said second refreeze mode when the product in one freezing chamber is below a minimum servable product viscosity for energizing said compressor drive motor and said beater drive motor and for generating and applying periodic pulse width modulated signals having a duty cycle PWF2' to the solenoid valve associated with said one of the freezing chambers and for generating and applying periodic pulse width modulated signals having a duty cycle PWH' to the solenoid valve associated with the other of the freezing chambers, until the product in said one of the freezing chambers reaches the minimum servable product viscosity, where the duty cycle PWF2' provides an effective refrigerant flow rate to increase the viscosity of the product in said one freezing chamber and the duty cycle PWH' provides an effective refrigerant flow rate to substantially maintain the viscosity of the product in said other freezing chamber.

11. The combination of claim 10 wherein the temperature sensing means each provide a product temperature signal that varies with the temperature of the product in the associated freezing chamber, and means responsive to said product temperature signals when the combined drive load exceeds the load threshold during the initial freeze cycle for calculating and setting a reference temperature for minimum servable product viscosity in each freezing chamber.

12. The combination of claim 11 wherein said means for setting a reference temperature is arranged to set an individual reference temperature for each freezing chamber correlative with the temperature signal from the associated temperature sensing means.

13. A method of controlling operation of a soft-serve dispensing apparatus including two freezing chambers each having an evaporator and a rotary beater, dispensing valve means for dispensing semi-frozen product from the freezing chambers, product supply means for supplying unfrozen product to the freezing chambers, a single beater drive motor for driving the beater means in both freezing chambers, refrigerant producer means including compressor means having a compressor drive motor and condenser means, and an on-off solenoid valve for controlling refrigerant flow to the eva means associated with each freezing chamber, said method including the steps of:

(a) sensing start-up of the apparatus and operating the apparatus in an initial freeze mode comprising generating and applying pulse width modulated signals having substantially equal duty cycles PWF1 to the solenoid valves associated with the evaporators for both freezing chambers, where the duty cycle PWF1 provides an effective refrigerant flow rate sufficient to increase the viscosity of the product in each freezing chamber;

(b) sensing when product is dispensed from only one of the freezing chambers and operating the apparatus in a first refreeze mode, generating and applying a periodic pulse width modulated signal to the solenoid valve associated with said one of the freezing chambers having a duty cycle PWF2 and generating and applying a periodic pulse width modulated signal to the solenoid valve associated with the other of the freezing chambers having a duty cycle PWH, where the duty cycle PWF2 provides an effective refrigerant flow rate sufficient to increase the viscosity of the product in said one freezing chamber and the duty cycle PWH provides an effective refrigerant flow rate sufficient to substantially maintain the viscosity of the product in said other freezing chamber;

(c) sensing a condition of the product in each freezing chamber that is correlative with a minimum servable product viscosity and, when the viscosity of the product in one freezing chamber is below a minimum servable product viscosity, operating the apparatus in a second refreeze mode comprising generating and applying periodic pulse width modulated signals having the duty cycle PWF2 to the solenoid valve associated with the freezing chamber that is below the preselected minimum servable product viscosity and generating and applying periodic pulse width modulated signals having the duty cycle PWH to the solenoid valve associated with the other freezing chamber.

14. The method of claim 13 including operation of the dispensing valve to dispense product from both freezing chambers concurrently and operating the apparatus in an alternate first refreeze mode comprising and applying pulse width modulated signals having said substantially equal duty signals PWF1 to the solenoid valves associated with the evaporators for both freezing chambers.

15. The method of claim 13 wherein the step of sensing the condition of the product in each freezing chamber comprises sensing the drive load for driving the beater in each chamber.

16. The method of claim 13 wherein the step of sensing the condition of the product in each chamber comprises sensing temperature of the product in the chamber.

17. A method of controlling operation of a soft-serve dispensing apparatus including two freezing chambers each having an evaporator and a rotary beater, dispensing valve means for dispensing semi-frozen product from the freezing chambers, product supply means for supplying unfrozen product to the freezing chambers, a single beater drive motor for driving the beater means in both freezing chambers, means for sensing the combined drive load for driving the beaters in both freezing chambers, and refrigerant producer means including compressor means having a compressor drive motor and condenser means, and an on-off solenoid valve for controlling refrigerant flow to the evaporator means associated with each freezing chamber, said method including the steps of:

(a) setting a combined load threshold correlative with the desired viscosity of a servable product in the freezing chambers;

(b) sensing start-up of the apparatus and operating the apparatus in an initial freeze mode comprising energizing the compressor drive motor and the beater drive motor and generating and applying pulse width modulated signals having substantially equal duty cycles PWF1 to the solenoid valves associated with the evaporators for both freezing chambers, where the duty cycle PWF1 provides an effective refrigerant flow rate sufficient to increase the viscosity of the product in each freezing chamber, and continuing in the initial freeze mode until the combined drive load exceeds the preset load threshold;

(c) setting a reference product temperature for minimum servable product viscosity in the freezing chambers;

(d) sensing when product is dispensed from only one of the freezing chambers and operating the apparatus in a first refreeze mode comprising energizing the compressor drive motor and the beater drive motor and generating and applying a periodic pulse width modulated signal to the solenoid valve associated with said one of the freezing chambers having a duty cycle PWF2 and generating and applying a periodic pulse width modulated signal to the solenoid valve associated with the other of the freezing chambers having a duty cycle PWH, where the duty cycle PWF2 provides an effective refrigerant flow rate sufficient to increase the viscosity of the product in said one freezing chamber and the duty cycle PWH provides an effective refrigerant flow rate sufficient to substantially maintain the viscosity of the product in said other freezing chamber, and continuing in the first refreeze mode until the combined drive load exceeds the load threshold;

(e) sensing the temperature of the product in each freezing chamber and comparing the product temperature in each chamber with the reference product temperature, and when the product temperature in one freezing chamber is above the reference product temperature, operating the apparatus in a second refreeze mode comprising energizing said compressor drive motor and said beater drive motor and generating and applying periodic pulse width modulated signals having the duty cycle PWF2 to the solenoid valve associated with the freezing chamber that is above the reference product temperature and generating and applying periodic pulse width modulated signals having the duty cycle PWH to the solenoid valve associated with the other freezing chamber, and continuing operation in the second refreeze mode until the product temperature in said one of the freezing chambers is lowered to the reference product temperature.

18. The method of claim 17 wherein the step of setting the reference product temperature includes sensing the product temperature in each freezing chamber when the combined drive load exceeds the load threshold in the initial freeze cycle, and setting a reference product temperature for each freezing chamber correlative with the sensed product temperature in each freezing chamber.

19. The combination of claim 18 wherein in the step of setting the reference product temperatures, a separate reference product temperature is set for each freezing chamber.

20. The method of claim 17 wherein the sum of the duty cycles of the pulse width modulated signals applied to the solenoid valves associated with both freezing chambers during each period is less than 100% of the period and the signals are applied to the solenoid valves alternately during each period.

21. The method of claim 17 wherein the pulse width modulated signals are applied to the solenoid valves associated with the two freezing chambers alternately during each period and the duty cycles PWF1 are each less than 50% of the period.

22. The method of claim 17 wherein the sum of the duty cycles PWF1 applied to the solenoid valves associated with both freezing chambers is in a range between 60% to 90% of the period of the pulse width modulated signals.

23. The method of claim 17 wherein the duty cycle PWH is substantially shorter than the duty cycle PWF1 and the duty cycle PWF2 is at least as long as the duty cycle PWF1.

24. The method of claim 17 wherein the sum of the duty cycles PWF1 applied to the solenoid valves associated with both freezing chambers is in a range between 60% to 90% of the period of the pulse width modulated signals and the sum of the duty cycles PWH and PWF2 is substantially equal to the sum of the duty cycles PWF1.

25. The method of claim 17 including operating said apparatus in an alternate first refreeze mode in response to concurrent dispense signals from the dispense sensing means associated with both freezing chambers, said alternate first refreeze mode comprising operating the compressor drive motor and the beater drive motor and generating and applying pulse width modulated signals having said substantially equal duty cycles PWF1 to the solenoid valves associated with both freezing chambers, and continuing operation in the alternate first refreeze mode until the combined drive load exceeds said threshold value.

* * * * *

UNITED STATES PATENT AND TRADEMARK OFFICE
CERTIFICATE OF CORRECTION

PATENT NO.   : 5,205,129
DATED        : April 27, 1993
INVENTOR(S)  : Gregory A. Wright et al It is certified that error appears in the above-identified patent and that said Letters Patent is hereby corrected as shown below:

Column 15, line 68, "eva" should be -- evaporator --.

Signed and Sealed this

Twenty-eighth Day of December, 1993

Attest:

BRUCE LEHMAN

Attesting Officer

Commissioner of Patents and Trademarks